April 9, 1957 P. D. KILBURY 2,788,416
SWITCHING APPARATUS AND HEATER CONTROL SYSTEM
Filed May 22, 1953 2 Sheets-Sheet 1

PAUL D. KILBURY,
INVENTOR.

BY
ATTORNEY

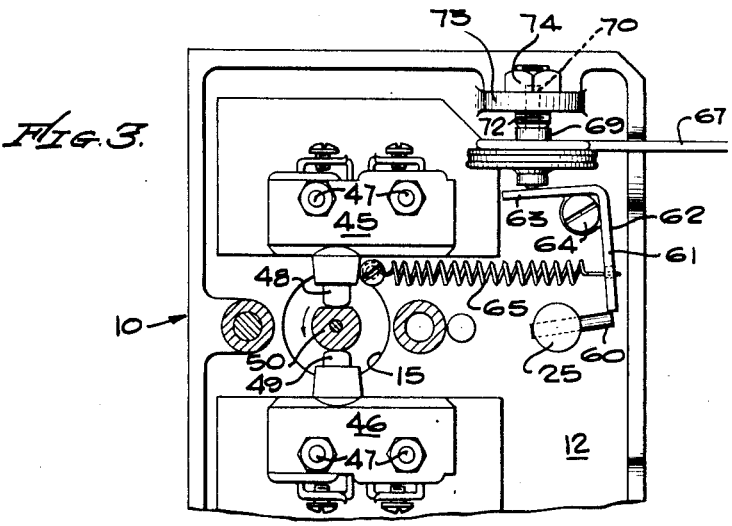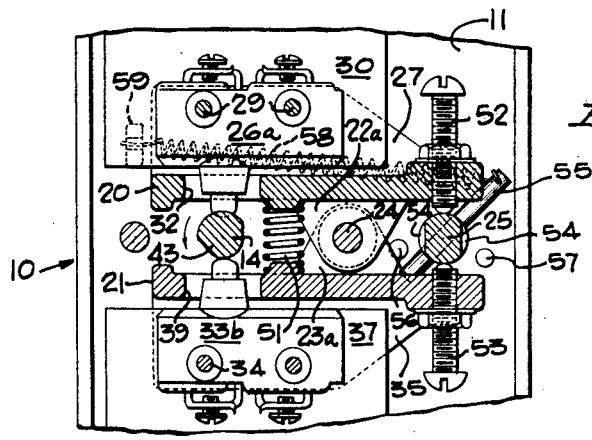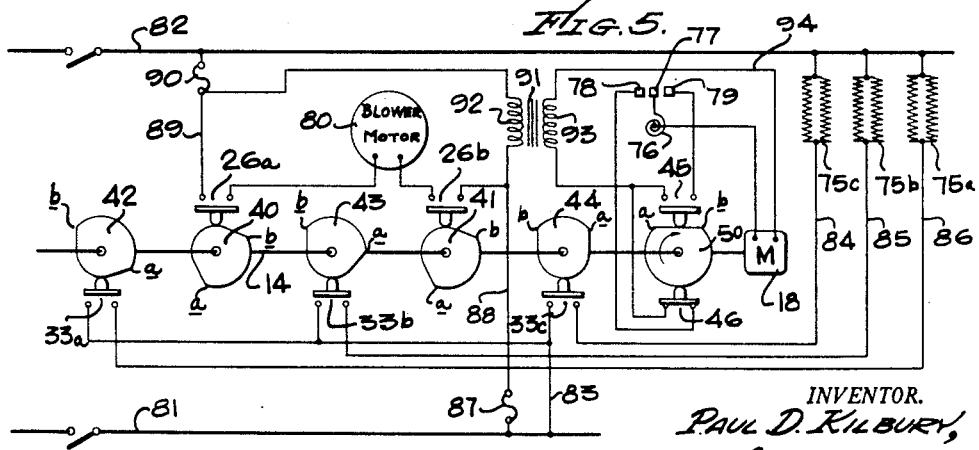

United States Patent Office 2,788,416
Patented Apr. 9, 1957

2,788,416

SWITCHING APPARATUS AND HEATER CONTROL SYSTEM

Paul D. Kilbury, Hawthorne, Calif.

Application May 22, 1953, Serial No. 356,780

3 Claims. (Cl. 200—140)

The present invention relates generally to switching apparatus, and is more particularly concerned with a switch for controlling a plurality of circuits in timed relation, and which is especially adapted for utilization in an electric heater control system.

It is an object of the herein described invention to provide improved switching apparatus, wherein small compact snap-action switches may be utilized for controlling circuits carrying relatively large amounts of electrical power.

A further object is to provide switching apparatus embodying means for tripping the switch under high temperature conditions, and which utilizes the temperature response action of a gas-filled capillary tube.

Still another object is to provide a control system for an electric heater, which embodies the herein described switching apparatus, and wherein the load of the heating elements will be divided into increments which are successively connected, provision being made to simultaneously disconnect all the heating elements upon the occurrence of abnormally high predetermined temperature.

Further objects of the invention will be brought out in the following part of the specification, wherein detailed description is for the purpose of fully disclosing the invention without placing limitations thereon.

Referring to the accompanying drawings, which are for illustrative purposes only:

Fig. 3 is an end elevational view, certain parts being removed, showing essential details of the temperature responsive tripping mechanism;

Fig. 4 is a transverse sectional view, taken substantially on line 4—4 of Fig. 2; and Fig. 5 is a schematic wiring diagram of a heating system utilizing the switching apparatus of the present invention, and showing details of the cam actuators of the control switches.

Referring now generally to the drawings, for illustrative purposes, the switching apparatus is illustrated as being supported upon a suitable framework 10 which may be variously constructed. As an example of one construction, this framework is shown as comprising wall members 11 and 12 which are retained in spaced apart relationship by means of one or more spacers 13, or other suitable means.

Figure 1:
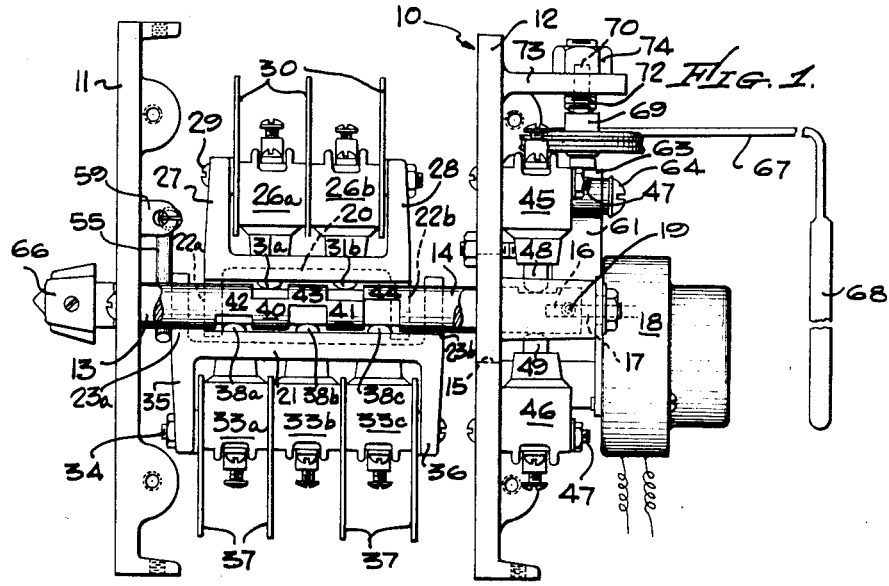
Fig. 1 is a view in elevation of switching apparatus embodying the features of the invention.

As shown in Fig. 1, the switch apparatus has an actuating shaft 14 which extends between the wall members 11 and 12, one end of the shaft being rotatably supported in the wall member 11, and the other end of the shaft extending through an opening 15 provided in the wall member 12. This end of the shaft, which projects outwardly beyond the wall 12, is provided with an end recess 16 adapted to receive endwise therein a driving shaft 17 of a driving motor 18, the driving shaft being secured to the shaft 14 as by a set screw 19 or other suitable means.

Positioned between the wall members 11 and 12, a pair of cradle frames 20 and 21 are supported for rocking movements by means of side lugs 22a and 22b on the cradle frame 20, which overlappingly extend between side lugs 23a and 23b formed on the cradle frame 21. The lugs are respectively provided with openings therein for receiving a pivot shaft 24 supported at its respective ends in the wall members 11 and 12.

As best shown in Figs. 1 and 4, it will be seen that the cradle frames are supported on the pivot shaft 24 so as to be spaced apart, and the cradle frames are positioned so that one set of their corresponding ends straddle the shaft 14, while their other set of corresponding ends straddle a shaft 25 which is also rotatably supported in the wall members 11 and 12 with its ends projecting outwardly beyond the adjacent wall structure.

The cradle frames 20 and 21 provide rocking supporting structures upon which there are mounted a plurality of snap-action switches which are operatively associated with the shaft 14 in a manner which will now be described in detail. The cradle frame 20 has a pair of snap-action switches 26a and 26b supported in side-by-side relation between integrally formed side flanges 27 and 28 of the cradle frame by means of bolts 29—29, the switches having their housing structures separated from each other and from the adjacent side flanges by means of insulating members 30. The switches 26a and 26b are respectively provided with actuating buttons 31a and 31b which extend through an elongate opening 32 of the cradle structure so as to position the outer ends of the buttons adjacent the shaft 14.

In a similar manner, the cradle frame 21 has a plurality, in this case three snap-action switches 33a, 33b and 33c supported by bolts 34 in side flanges 35 and 36, insulating members 37 being similarly provided in this case. These switches have actuating buttons 38a, 38b and 38c, which extend through opening 39 in this case to position their ends adjacent the shaft 14.

The snap-action switches contain normally open contacts which are arranged to be snapped into closed position upon inward movements of the actuating buttons of the respective switches. For moving the actuating buttons, cams are formed in the surface of the shaft 14 so that upon rotation of this shaft, the snap-action switches will be actuated in the desired manner. In the present instance, cams 40 and 41 are arranged to actuate the switches 26a and 26b, while cams 42, 43 and 44 are arranged to actuate the switches 33a, 33b and 33c respectively.

In addition to the snap-action switches described above, a pair of snap-action limit switches 45 and 46 are supported on the outer surface of wall member 12 by means of supporting bolts 47. These switches are positioned on opposite sides of the shaft 14 with actuating buttons 48 and 49 extending towards the shaft where they are associated with a cam 50. The actuating buttons of these switches, it will be noted, are in 180° relationship.

In the switch structure of the present invention, the cams carried by the shaft 14 are arranged to actuate the associated snap-action switches according to a predetermined cycle. As most clearly shown in Fig. 5, with the shaft 14 operating in a clockwise direction when viewed from its left end, the respective switch closing and opening points have been indicated on the cams at $a$ and $b$ respectively.

Considering first the cams 42, 43 and 44, starting from a position of rest as shown, the shaft 14 must move through an angle of 60° in order to bring the point $a$ of the cam 42 to a position where it closes snap-action switch 33a. In the case of cam 43, the cam must move through an angle of 90° in order to close the contacts of switch 33b. In the case of cam 44, the cam must move through an angle of 120°. It will therefore be seen that the switches 33a, 33b and 33c will be successively closed by successive angular movements of the shaft 14 through angles of 30°. It will also be observed that the point b for each of the cams 42, 43 and 44 is similarly positioned so that as the shaft 14 continues to rotate, the switches 33a, 33b and 33c will be simultaneously opened.

The two switches 26a and 26b are arranged to simultaneously close and simultaneously open as a result of the operation of the cams 40 and 41, respectively. From the rest position shown, it will be seen that the cams 40 and 41 will have to rotate through an angle of 160° in order to bring the switch closing points a into proper position, and that the closing of these switches will take place upon an angular movement of the shaft 14 through an angle of 40° after the closing of switch 33c.

As regards the operation of the switches 45 and 46 by the cam 50, it will be seen that the switch 45 in the position of rest, as shown, is in open position, while the switch 46 has its contacts closed. After the shaft has rotated through a predetermined angle, the point a of the cam 50 engages and closes the contacts of switch 45 until the shaft has rotated through an angle of 180°, whereupon point b of the cam is reached and switch 46 opened. The operating circuits associated with the snap-action switches as described above will be subsequently discussed in greater detail in connection with the heater control system.

Referring again to Fig. 4, an expansion spring 51 is positioned between the shaft 14 and the pivot shaft 24, the ends of this spring being respectively anchored in engagement with the cradle frames 20 and 21. This spring biases the cradle frames 20 and 21 in a direction which moves the adjacent ends apart, and as a result such movement, if permitted, carries the snap-action switches and their associated actuating buttons away from the actuating cams on the shaft 14. Normally, biased movement of the cradle frames 20 and 21 is opposed by the shaft 25 which is arranged at diametral points on its surface to engage with adjustable follower screws 52 and 53 having their ends bearing against the surface of shaft 25. By threaded adjustment of these screws, the cradle frames may be rocked so as to vary their normal position and thus adjust the actuation of the snap-action switches.

The shaft 25 is utilized for tripping the switch apparatus upon the occurrence of a predetermined condition, at which time it is desired to simultaneously open the contacts of all of the snap-action switches. This is accomplished by providing diametrically opposed recessed surfaces 54—54, in 90° relation to the normal position of the shaft 25 as shown in Fig. 4. In other words, the recessed surfaces 54 are so arranged that, upon rotation of the shaft 25 through an angle of 90°, the ends of the screws 52 and 53 are permitted to move towards each other under the action of spring 51 an amount sufficient to disassociate the actuating buttons of the snap-action switches from their associated operating cams and permit opening of the switch contacts.

The shaft 25 carries a transversely extending pin 55 one end of which is arranged to move between limit stop pins 56 and 57 which respectively determine the normal and tripped positions of the shaft 25. The opposite end of the pin 55 is connected with one end of a tensioned spring 58 which is anchored at its other end to a projecting lug 59 carried by the wall member 11. The spring 58 biases the shaft 25 for movement in a counterclockwise direction, as viewed in Fig. 4, and tends to move the associated end of the pin 55 into engagement with stop pin 57.

As shown in Fig. 3, the end of the shaft 25 which projects beyond the wall member 12 is provided with a projecting pin 60 which is operatively associated with a leg 61 of a latch member 62 having another leg 63 in right angle relation to the leg 61. The latch member at the juncture of the legs 61 and 63 is supported for pivotal movement upon a pivot screw 64. A tensioned spring 65 anchored at one end to the wall member 12 and connected at its other end to the leg 61 of the latch member 62 acts to bias the latch member for movement in a clockwise direction, as viewed in Fig. 3, and, upon movement of the shaft 25 to its normal position, to move back of the end of the pin 60 and oppose counterclockwise rotation of the shaft 25 to its tripped position under the action of spring 58.

Figure 2:
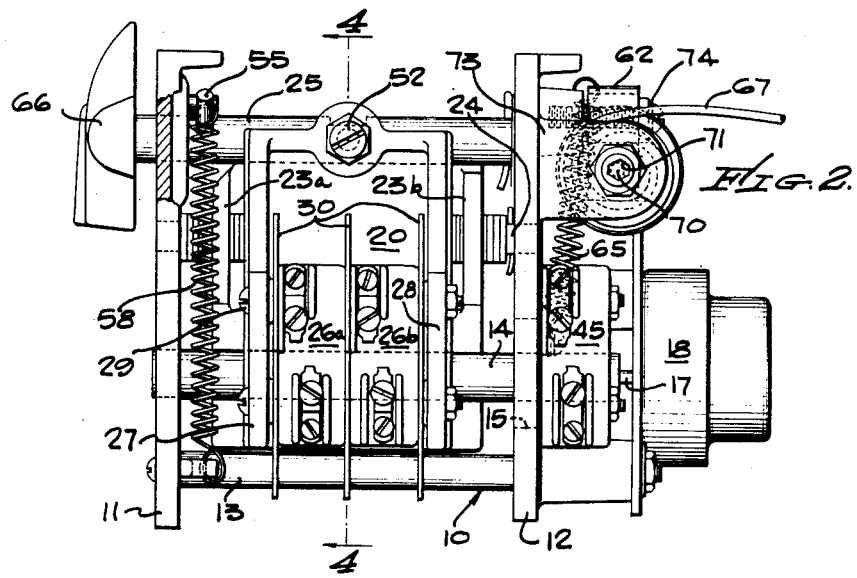
Fig. 2 is a plan view of the same.

Provision is made for manually resetting the shaft 25 to normal position, after its having been tripped by releasing the latch member 62. For such purpose, the opposite end of the shaft 25, as shown in Figs. 1 and 2, is provided with a reset knob 66 by which the shaft may be manually turned to a position which will permit the end of leg 61 to again move back of the pin 60.

From the above description, it is evident that various types of sensing devices may readily be associated with the latch member for moving it to released position with respect to the pin 60 upon the occurrence of a predetermined condition or upon changes in a sensed medium. Heretofore, it has been especially difficult to utilize a gas-filled capillary tube for tripping switches of this type in response to the occurrence of a high temperature. With the tripping arrangement previously described, and as controlled by the above related latch member 62, such protective feature becomes readily available. More specifically, as shown in Figs. 1 and 3, a temperature sensing device is utilized which comprises a capillary tube 67 connected at one end to a sensing bulb 68 and at its opposite end to an expansible and contractable body 69. The body 69 is provided at one end with a contracted projecting portion 70 which is inserted into a tubular bore 71 of a cylindrical adjusting screw 72 having threaded engagement with a lug 73 carried by the wall 12. The opposite end of the body 69 bears against the leg 63 of the latch member 62 in such a manner that, as the body 69 expands under increased sensed temperature, the effect will be to rotate the latch member counterclockwise about its pivot. When the temperature has increased sufficiently, the leg 61 will be moved out from behind the pin 60 and thus release the shaft 25 for movement to tripping position. The temperature at which the latch member 62 releases the shaft 25 may be adjusted by adjusting the position of the screw 72 in the lug 73. Once the desired position is found, the screw may be locked in adjusted position by means of an associated lock nut 74.

Referring now to Fig. 5, a heater control system embodying the present invention has been disclosed as comprising a plurality of electric heating elements 75a, 75b and 75c, a thermostatic control 76 in which a contact 77 is movable into engagement with a contact 78 when there is a call for heat and with a contact 79 when there is a call for cooling. A blower unit driven by blower motor 80 is arranged to blow air over the heating unit for distribution in conventional manner.

Operating current is supplied from main line conductors 81 and 82. The heating elements are supplied through sequentially switched energizing circuits as follows: From main conductor 81 through a common conductor 83 to one side of each of the switches 33a, 33b and 33c, thence from the other terminals of these switches through separate feed conductors 84, 85 and 86 to the heating elements, and thence to the other main conductor 82.

The blower motor has an energizing circuit as follows: From the main conductor 81 through a fuse 87, a conductor 88 through switch 26b to one terminal of the blower motor, thence from the other terminal of the blower motor through switch 26a, conductor 89, and thence through fuse 90 to the main conductor 82.

Power is supplied to the motor 18 from a step down transformer 91 having its primary 92 connected with the main conductors 81 and 82, and its secondary connected at one end by conductor 94 directly to the motor. The other terminal of the transformer secondary winding 93 is connected through branch circuits containing switches 45 and 46 to contacts 79 and 78 respectively of the thermostatic switch 76.

The operation of the above described heater control system is as follows: Assuming that the system has not been in operation and there is a call for heat. With the main conductors 81 and 82 energized, the call for heat will actuate the thermostat and move contact 77 into engagement with contact 78. This will energize the motor 18 through limit switch 46, whereupon the motor begins operation and rotating the shaft 14. By utilizing a motor having a predetermined speed, for example one R. P. M., actuation of the snap-action switches will be accomplished in timed relation in accordance with the relative positions of the cams of the shaft 14.

As soon as the shaft 14 has rotated through an angle of 60°, the cam 42 acts to close switch 33a which energizes heating element 75a through conductor 86. A further movement of the shaft 14 through an angle of 30° causes cam 43 to close switch 33b and similarly energize heating element 75b. As the movement of the shaft continues through the next 30°, cam 44 actuates switch 33c to energize heating element 75c. By this action, the heating element load is split up into increments which are successively connected.

Further travel of the shaft 14 through an angle of 40°, which corresponds to approximately a time interval of seven seconds after closure of switch 33c, the cams 40 and 41 act to simultaneously close switches 26a and 26b to start the blower motor.

All of the switches are now closed and the motor will continue to turn the shaft 14 until the flat face of the cam 50 reaches a position which will permit opening of switch 46, which will act to deenergize the motor 18 and stop its operation.

The heater now being in operation will continue until the thermostat 76 calls for cooling, whereupon, depending upon the thermostat adjustment, contact 77 will engage contact 79 and again energize the motor 18 through limit switch 45 which is now closed. The motor will continue to rotate the shaft 14 through 180° to a position wherein limit switch 45 opens to shut down the motor.

During the call for cooling movement of the shaft 14, the points b on the cams 42, 43 and 44 respectively will simultaneously reach position wherein the switches 33a, 33b and 33c will deenergize the heating elements. The blower motor, however, continues to operate for a predetermined time interval until the points b on cams 40 and 41 reach a position which permits opening of switches 26a and 26b, whereupon the blower motor shuts down.

If for some abnormal operating condition the above described operation fails to take place and the heating operation continues, the thermal sensitive tripping mechanism of the switching apparatus will then function. Depending upon the adjustment, the latch member 62 will be moved counterclockwise to a point releasing pin 60. This pin being released, permits counterclockwise rotation of the shaft 25 under the action of spring 58 to a position wherein the recessed surfaces 54 are moved under the ends of the follower screws 52 and 53. When this happens, the spring 51 biases the associated ends of the cradle frames 20 and 21 apart so as to disassociate the actuating buttons of the switches 26a, 26b, 33a, 33b and 33c from their associated cams. The switches are then free to open their contacts and shut down the blower motor and deenergize the heating elements of the system.

Various modifications may suggest themselves to those skilled in the art without departing from the spirit of my invention, and, hence, I do not wish to be restricted to the specific form shown or uses mentioned, except to the extent indicated in the appended claims.

I claim:

1. Switching apparatus, comprising: a rotatable shaft, a plurality of cams carried by said shaft; a pair of supports hingedly interconnected between their ends and positioned with one set of their adjacent ends straddling said shaft; a plurality of snap-action switches carried by said set of ends on opposite sides of said shaft, said switches having individual actuating buttons engageable by said cams upon shaft rotation; a spring tending to bias said ends apart to disassociate the buttons from said cams; a cam between the other set of adjacent ends of said supports, said cam being mounted for movement to a first position opposing the action of said spring and biased for movement to a second position permitting said spring to move said one set of ends apart; means latching said last cam in said first position; and means for releasing said latching means, upon the occurrence of a predetermined operating condition, including a temperature responsive gas-filled capillary tube.

2. Switching apparatus, comprising: a rotatable shaft, a plurality of cams carried by said shaft; a pair of supports hingedly interconnected between their ends and positioned with one set of their adjacent ends straddling said shaft; a plurality of snap-action switches carried by said set of ends on opposite sides of said shaft, said switches having individual actuating buttons sequentially engaged by said cams to close the switches upon rotation of the shaft; a spring tending to bias said ends apart to disassociate the buttons from said cams; tripping means including a cam positioned between the other set of adjacent ends of said supports normally opposing the action of said spring, but upon rotative movement permitting said spring to move said one set of ends apart; and means for rotating said last cam upon the occurrence of a predetermined operating condition.

3. Switching apparatus, comprising: a rotatable shaft, a plurality of cams carried by said shaft; a pair of supports hingedly interconnected between their ends and positioned with one set of their adjacent ends straddling said shaft; a plurality of snap-action switches carried by said set of ends on opposite sides of said shaft, said switches having individual actuating buttons engageable by said cams upon shaft rotation; a spring tending to bias said ends apart to disassociate the buttons from said cams; and tripping means including a cam positioned between the other set of adjacent ends of said supports normally opposing the action of said spring, but upon rotative movement permitting said spring to move said one set of ends apart.

References Cited in the file of this patent

UNITED STATES PATENTS

| Number | Name | Date |
|---|---|---|
| 1,724,119 | Vermilye | Aug. 13, 1929 |
| 2,092,085 | Riley | Sept. 7, 1937 |
| 2,194,587 | Brown | Mar. 26, 1940 |
| 2,254,484 | Hutchins | Sept. 2, 1941 |
| 2,320,895 | Sherlock et al. | June 1, 1943 |
| 2,335,886 | Reutter | Dec. 7, 1943 |
| 2,379,305 | Kaminky | June 26, 1945 |
| 2,410,384 | Lindsay | Oct. 29, 1946 |
| 2,435,530 | Candor | Feb. 3, 1950 |
| 2,575,994 | Bone et al. | Nov. 20, 1951 |
| 2,591,849 | McDowell | Apr. 8, 1952 |
| 2,623,979 | Shewmon | Dec. 30, 1952 |
| 2,642,503 | Dietrich | June 16, 1953 |
| 2,676,235 | Kennedy et al. | Apr. 20, 1954 |